United States Patent [19]
Koden et al.

[11] Patent Number: 5,729,307
[45] Date of Patent: Mar. 17, 1998

[54] ANTIFERROELECTRIC LCD IN WHICH A NORMAL TO AN ANTIFERROELECTRIC LIQUID CRYSTAL LAYER IS ORTHOGONAL TO A NORMAL TO A SECOND ANTIFERROELECTRIC LIQUID CRYSTAL LAYER

[75] Inventors: Mitsuhiro Koden; Kazuhiko Tamai, both of Kashiwa, Japan

[73] Assignee: Sharp Kabushiki Kaisha, Japan

[21] Appl. No.: 548,272

[22] Filed: Oct. 25, 1995

[30] Foreign Application Priority Data

Oct. 25, 1994 [JP] Japan ................... 6-260568

[51] Int. Cl.$^6$ .................. G02F 1/133; G02F 1/1347; G02F 1/13; G09G 3/36
[52] U.S. Cl. ................. 349/33; 349/37; 349/74; 349/77; 349/96; 349/165; 349/174; 345/97
[58] Field of Search ............ 349/33, 37, 77, 349/174, 75, 173, 96, 99, 165, 74; 345/89, 94, 97

[56] References Cited

U.S. PATENT DOCUMENTS

| 5,126,864 | 6/1992 | Akiyama et al. | 349/75 |
| 5,367,391 | 11/1994 | Johno et al. | 349/37 |
| 5,477,354 | 12/1995 | Schehrer | 349/74 |
| 5,589,966 | 12/1996 | Hama et al. | 349/174 |

FOREIGN PATENT DOCUMENTS

| 61-179417 | 8/1986 | Japan | 349/165 |
| 4122913 | 4/1992 | Japan . | |
| 4186230 | 7/1992 | Japan . | |
| 5142583 | 6/1993 | Japan . | |
| 6-095080 | 4/1994 | Japan . | |
| 6-202082 | 7/1994 | Japan . | |

OTHER PUBLICATIONS

A.D.L. Chandani et al., Japanese Journal of Applied Physics, vol. 28, No. 7, pp. L1265–L1268, 1989 "Antiferroelectric Chiral Smectic Phases Reponsible for the Tristable Switching in MHPOBC".

Y. Yamada, et al., Japan Display '92, pp. 57–60, 1992 "Multi–Color Video–Rate Antiferroelectric LCDs with High Contrast and Wide View".

N. Yamamoto et al., Ferroelectrics, vol. 149, pp. 295–304, 1993, "Full–Color Antiferroelectric Liquid Crystal Display".

K. Ui et al., Preprints of the 17th Liquid Crystal Meeting, pp. 408–409, 1991, "Electro–Optical Characteristics of Double-–Layer Ferroelectric Liquid Crystal".

Primary Examiner—William L. Sikes
Assistant Examiner—Walter J. Malinowski
Attorney, Agent, or Firm—David G. Conlin; John L. Welch

[57] ABSTRACT

An antiferroelectric liquid crystal device of the present invention includes at least a first antiferroelectric liquid crystal cell and a second antiferroelectric liquid crystal cell, wherein the first and second antiferroelectric liquid crystal cells respectively have an antiferroelectric liquid crystal material interposed between a pair of electrode substrates each having an electrode film and an alignment layer, and the first and second antiferroelectric liquid crystal cells are disposed so that a normal to an antiferroelectric liquid crystal layer of the first antiferroelectric liquid crystal cell is orthogonal to a normal to an antiferroelectric liquid crystal layer of the second antiferroelectric liquid crystal cell.

12 Claims, 16 Drawing Sheets

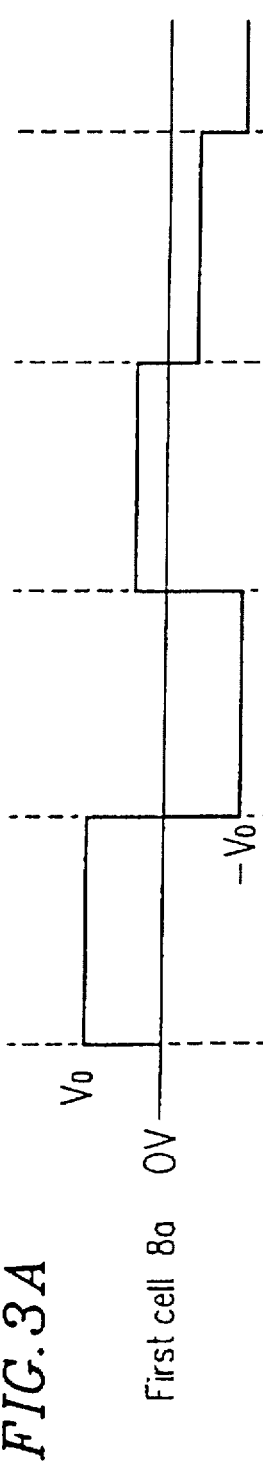
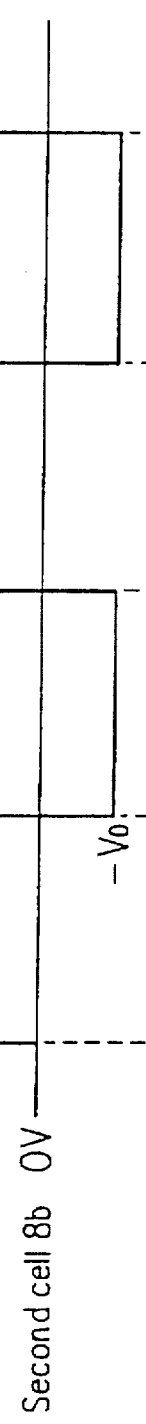
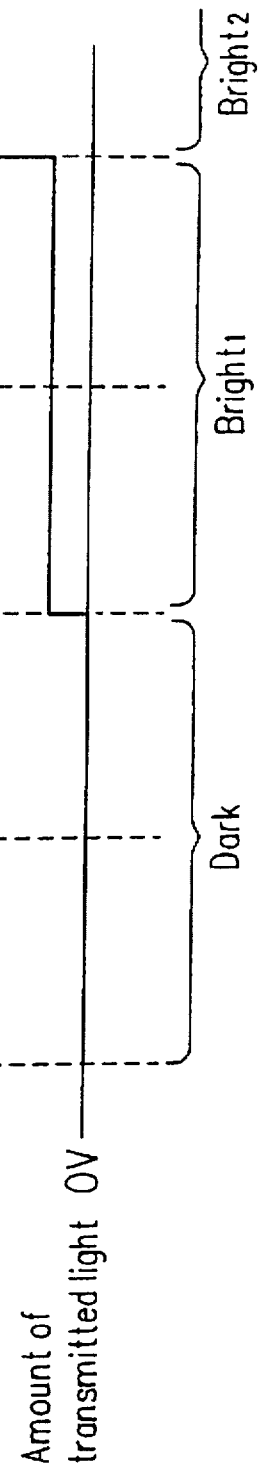
FIG.3A  First cell 8a
FIG.3B  Second cell 8b
FIG.3C  Amount of transmitted light

ANTIFERROELECTRIC LCD IN WHICH A NORMAL TO AN ANTIFERROELECTRIC LIQUID CRYSTAL LAYER IS ORTHOGONAL TO A NORMAL TO A SECOND ANTIFERROELECTRIC LIQUID CRYSTAL LAYER

BACKGROUND OF THE INVENTION

1. Field of the Invention

The present invention relates to an antiferroelectric liquid crystal device used for a liquid crystal display apparatus and a shutter portion, and a method for driving the same.

2. Description of the Related Art

In recent years, antiferroelectric liquid crystal (AFLC) was discovered by Chandani et al. of Fukuda laboratory in Tokyo Institute of Technology (A. D. L. Chandani, E. Gorecha, Y. Ouchi, H. Takezoe and A. Fukuda, Jpn. J. Appl. Phys., 28, L1265 (1989)), and a display method using AFLC has been studied.

FIGS. 14(a) to 14(c) show the operational principles of the above-mentioned AFLC. AFLC has a helical structure in a bulk state. However, when being injected into a liquid crystal cell having a thickness smaller than the helix pitch, the helical structure is undone to have a layered molecular arrangement as shown in FIG. 14(a). In an AFLC cell, the AFLC phase has a layered structure (hereinafter referred to an AFLC layer). The AFLC layer includes plurality of smectic layers. AFLC molecules in each layer are arranged so as to tilt against a stacking direction of the smectic layer (hereinafter referred to a normal to the AFLC layer). Unlike ferroelectric liquid crystal (FLC), the directions in which molecules of AFLC tilt in a given layer are opposite to the molecules of a next layer, whereby AFLC assumes a dark state (see FIG. 14(a)). When an electric field is applied to this liquid crystal cell, the molecules are rearranged so as to align the spontaneous polarization of molecules with the direction of the electric field. As a result, the molecules shift from a dark state to a bright state as shown in FIGS. 14(a) to 14(b) or 14(c). When a polarization axis of a polarizing plate is aligned with the normal to the AFLC layer, a voltage-transmittance curve of a double hysteresis property can be performed as shown in FIG. 15. A simple matrix display can be conducted by utilizing such a hysteresis property; for example, AFLC display devices have been prototyped by Nippondenso Co., Ltd. and Showa Shell Sekiyu K. K. (Y. Yamada, N. Yamamoto, M. Yamawaki, I. Kawamura and Y. Suzuki, Proc. Japan Display '92, 57 (1992)). Furthermore, a gray-scale display by simple matrix driving using the AFLC phase have been reported (N. Yamada et al., Ferroelectrics, 149, 295 (1993)).

FIG. 16 shows an example of a basic structure of the above-mentioned AFLC device. In this AFLC device, each substrate portion includes an electrode film 2 made of indium tin oxide (ITO) formed on a glass substrate 1, an insulating film 5 formed on the electrode film 2, and an alignment film 3 formed on the insulating film 5. As the alignment film 3, a film made of a polymer such as polyimide is usually used, and its surface is subjected to rubbing treatment. The two substrate portions are disposed so that the respective alignment films 3 face each other and are attached with a sealant 6 having a cell thickness of about 2 μm. A liquid crystal material 4 is injected into a gap between the substrate portions to be sealed therein; thus, a liquid crystal cell is constructed. A pair of polarizing plates 7 are provided on both external faces of the liquid crystal cells, and a driving circuit (not shown) is connected to the respective electrode films 2.

The above-mentioned conventional AFLC device has problems, such as low contrast. The reasons for this are considered to be as follows.

(1) The hysteresis property of actual AFLC cells as represented by a solid line in FIG. 17 is shifted on a lower voltage side from an ideal hysteresis property represented by a broken line. This is caused by molecule movement when the AFLC cells are driven in a soft mode. Therefore, a bias voltage causes the leakage of light when simple matrix driving is conducted, and thus, a black state with a sufficiently low amount of transmitted light is not likely to be obtained. In fact, in the AFLC display devices prototyped by Nippondenso Co., Ltd. and Showa Shell Sekiyu K. K., the contrast obtained is only about 20.

(2) In general, an AFLC material does not have a nematic phase. Therefore, when an AFLC material is injected into a cell as an isotropic liquid and cooled to align the molecules of the material, a smectic phase directly appears from the isotropic liquid to form small domains which make it difficult to obtain a satisfactory initial alignment of liquid crystal molecules. This initial state corresponds to a display in a dark state, and a state obtained with a voltage applied corresponds to a display in a bright state. The above-mentioned small domains cause the leakage of light in an initial state, resulting in a decrease in contrast.

For the above-mentioned reasons, it is considered difficult to realize a high-quality liquid crystal display with a contrast of 100:1 or more by using conventional simple matrix AFLC devices.

Devices including at least two AFLC cells layered one on top of the other are reported, for example, in Japanese Laid-Open Patent Publication Nos. 4-122913 and 5-142583.

Japanese Laid-Open Patent Publication No. 4-122913 discloses a guest-host type device in which two AFLC cells each containing a dichroic colorant are disposed so as to match both normals to AFLC layers with each other and tilt directions of AFLC molecules in the respective cells are inverted with each other by the application of an electric field. In this AFLC device, a bright state is obtained with no electric field applied, and a dark state is obtained with an electric field applied. In this device, in order to obtain a high contrast, it is required to set an angle formed by a molecular long axis of the first cell and that of the second cell at 90° or more when an electric field is applied to the cells. As is known, the tilt angle of AFLC has temperature dependence. Furthermore, the angle formed by the molecular axes cannot be 90° when AFLC with a tilt angle of 45° or less is used in this device. Therefore, it is difficult to obtain a high contrast using this device.

Japanese Laid-Open Patent Publication No. 5-142583 discloses a device in which two AFLC cells are disposed so as to match both optic axes (an optic axis matches with a normal to the AFLC layer) with each other under the condition of no voltage applied, and a polarization axis of one of a pair of polarizing plates disposed with these two cells placed therebetween is matched with the optic axes of the cells. In this AFLC device, a dark state is obtained with no electric field applied, and a bright state is obtained with an electric field applied. In this device, it is important to sufficiently decrease leakage of light is when no electric field is applied in order to obtain a high contrast. Thus, contrast problems similar to those of one-layer type AFLC device have not been solved.

Furthermore, Japanese Laid-Open Patent Publication No. 4-186230 and Preprints of The 17th Liquid Crystal Meeting, pp. 408–409 (1991) report devices in which two FLC cells are disposed so that both stacking directions of FLC layers are orthogonal to each other.

Japanese Laid-Open Patent Publication No. 4-186230 discloses an optical modulating device in which two bistable FLC cells are disposed so that both stacking directions of FLC layers are orthogonal to each other. In this device, by disposing these two cells in this manner, temperature dependence of a corn angle of liquid crystal molecules is cancelled, whereby a satisfactory black state is obtained irrespective of the change in temperature. However, this device does not enable a gray-scale display to be obtained because of the use of bistable FLC.

Preprints of The 17th Liquid Crystal Meeting, pp. 408-409 (1991) disclose a liquid crystal display device in which two FLC cells are disposed so that both stacking directions of FLC layers are orthogonal to each other. In this device, a gray-scale display can be obtained by shifting phases of rectangular waves applied to these two cells. The Preprints do not mention AFLC.

SUMMARY OF THE INVENTION

I one embodiment, the antiferroelectric liquid crystal device of the present invention includes at least a first antiferroelectric liquid crystal cell and a second antiferroelectric liquid crystal cell, wherein the first and second antiferroelectric liquid crystal cells respectively have an antiferroelectric liquid crystal material interposed between a pair of electrode substrates each having an electrode film and an alignment layer, and the first and second antiferroelectric liquid crystal cells are disposed so that a normal to an antiferroelectric liquid crystal layer of the first antiferroelectric liquid crystal cell is orthogonal to a normal to an antiferroelectric liquid crystal layer of the second antiferroelectric liquid crystal cell.

In one embodiment of the present invention, a pair of polarizing plates are disposed sandwiching the first and second antiferroelectric liquid crystal cells so that respective polarization axes are orthogonal to each other.

In another embodiment of the present invention, the polarization axis of one of the polarizing plates matches with the normal to the antiferroelectric liquid crystal layer of one of the first and second antiferroelectric liquid crystal cells.

In another embodiment of the present invention, at least one of the first and second antiferroelectric liquid crystal cells contains a dichroic colorant.

According to another aspect of the present invention, a method for driving an antiferroelectric liquid crystal device is provided. The device includes at least a first antiferroelectric liquid crystal cell and a second antiferroelectric liquid crystal cell, the first and second antiferroelectric liquid crystal cells respectively having an antiferroelectric liquid crystal material interposed between a pair of electrode substrates each having an electrode film and an alignment layer, and the first and second antiferroelectric liquid crystal cells being disposed so that a normal to an antiferroelectric liquid crystal layer of the first antiferroelectric liquid crystal cell is orthogonal to a normal to an antiferroelectric liquid crystal layer of the second antiferroelectric liquid crystal cell. The method includes the steps of: applying a voltage of a predetermined polarity and a level sufficient for allowing liquid crystal molecules to shift from an antiferroelectric liquid crystal state to a ferroelectric liquid crystal state to either one of the first and second antiferroelectric liquid crystal cells to tilt an optic axis of the antiferroelectric liquid crystal cell with the voltage applied thereto; and applying an arbitrary voltage to the other antiferroelectric liquid crystal cell to obtain a gray-scale display.

Alternatively, another method for driving an antiferroelectric liquid crystal device is provided. The device includes at least a first antiferroelectric liquid crystal cell and a second antiferroelectric liquid crystal cell, the first and second antiferroelectric liquid crystal cells respectively having an antiferroelectric liquid crystal material interposed between a pair of electrode substrates each having an electrode film and an alignment layer, and the first and second antiferroelectric liquid crystal cells being disposed so that a normal to an antiferroelectric liquid crystal layer of the first antiferroelectric liquid crystal cell is orthogonal to a normal to an antiferroelectric liquid crystal layer of the second antiferroelectric liquid crystal cell. The method includes the step of: repeating a first period, during which a voltage of a predetermined polarity and a level sufficient for allowing liquid crystal molecules to shift from an antiferroelectric liquid crystal state to a ferroelectric liquid crystal state is applied to either one of the first and second antiferroelectric liquid crystal cells, and a second period, during which a voltage of level identical with a level of the voltage of the first period and a polarity opposite thereto is applied to the same antiferroelectric liquid crystal cell.

According to the present invention, the first AFLC cell and the second AFLC cell are disposed so that normals to AFLC layers are orthogonal to each other.

When a voltage of a predetermined polarity and a level sufficient for allowing liquid crystal molecules to shift from an AFLC state to an FLC state is applied to one of the first and second cells, an optic axis of the cell which is applied with the voltage tilts by $\theta$. When an arbitrary voltage is applied to the other cell under this condition, the optic axis of that cell varies between $\theta$ and $-\theta$ depending upon the level and the sign of polarity of the arbitrary voltage. As a result, the amount of transmitted light is varied in accordance with the applied voltage, whereby a gray-scale display can be performed. When $2\theta=45°$, the brightest display is obtained. A material satisfying this condition can be more easily obtained, compared with a material satisfying $\theta=45°$ required in a single-layered device.

In the AFLC cell, since the optic axis matches with the normal to the AFLC layer under the application of no voltage, when two polarizing plates are provided so that polarization axes are orthogonal to each other, a dark state is obtained under the application of no voltage. This state is not used for display, so that the decrease in contrast caused by light leakage as in conventional devices does not occur.

When the polarization axis of one of the polarizing plates is allowed to match with the normal to the AFLC layer of one of the cells, display characteristics can be made symmetric.

When a dichroic colorant is contained in one of the cells, a gray-scale display can be obtained without using polarizing plates. A contrast can be further improved by using polarizing plates.

When a voltage of a predetermined polarity and a level sufficient for allowing liquid crystal molecules to shift from an AFLC state to an FLC state and another voltage which has an opposite polarity and the same level are alternately applied to one of the cells for a predetermined period, a DC component does not remain; therefore operational reliability of the device can be improved.

Thus, the invention described herein makes possible at least the following advantages: (1) providing an AFLC device capable of performing a gray-scale display with a high contrast and high reliability; and (2) providing a method for driving the same.

BRIEF DESCRIPTION OF THE DRAWINGS

FIGS. 3A through 3C show a timing diagram for illustrating a method for driving the AFLC device of Example 1 according to the present invention.

DESCRIPTION OF THE PREFERRED EMBODIMENTS

Hereinafter, the present invention will be described by way of illustrative examples with reference to the drawings. It is not intended that the present invention is limited by any of the following examples.

Example 1

Figure 1:
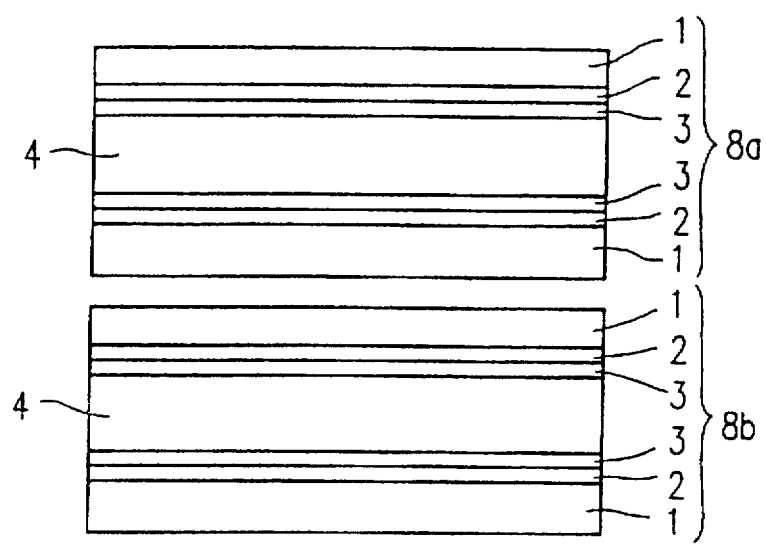
FIG. 1 is a cross-sectional view showing a structure of an AFLC device of Example 1 according to the present invention.

FIG. 1 is a cross-sectional view showing a structure of an AFLC device of Example 1 according to the present invention. As shown in FIG. 1, the device has a double-layered structure including a first AFLC cell 8a and a second AFLC cell 8b. Each of the cells 8a and 8b has a pair of substrates 1 on which electrode films 2 and alignment layers 3 are formed in this order. The respective pairs of substrates 1 are disposed so that the alignment layers 3 face each other, and an AFLC material 4 is interposed in a gap between the respective pairs of the substrates 1.

As described above, the cell 8a and the cell 8b have the same AFLC material 4 and are disposed so that normals to AFLC layers are orthogonal to each other.

As the substrate 1 included in the cells 8a and 8b, a glass substrate, a Si substrate, and the like are used. It is required that at least three electrode films 2 from a viewing side are transparent, and as a material for the transparent electrode films 2, ITO is generally used. If desired, the electrode films 2 are patterned to a predetermined shape. Herein, in order to obtain a transmission type device, all of the four electrode films 2 are made transparent. Furthermore, it is preferred that the alignment layer 3 aligns liquid crystal molecules in a horizontal direction of the substrates 1. Those aligning liquid crystal molecules in a substantially vertical direction of the substrates 1 are not preferred. Examples of the alignment layer 3 include an SiO obliquely evaporated film and a polyimide film. In the case where polyimide films are used for the alignment layer 3, the surface of the resultant alignment layer 3 is subjected to rubbing so as to obtain uniaxial orientation. In recent years, there are a number of reports on methods for aligning liquid crystal molecules using means other than rubbing. These reported methods can be appropriately used. If desired, an insulating film (not shown) is formed between the alignment layer 3 and the electrode film 2.

The substrate portions each including the substrate 1, the electrode film 2, and the alignment layer 3 are attached to each other with a gap of about 1 to about 3 μm, preferably about 2 μm. Spacers can be dispersed between the attached substrate portions so as to control a substrate gap. The AFLC material 4 is injected into the substrate gap, whereby an AFLC device can be produced.

Figure 2A:
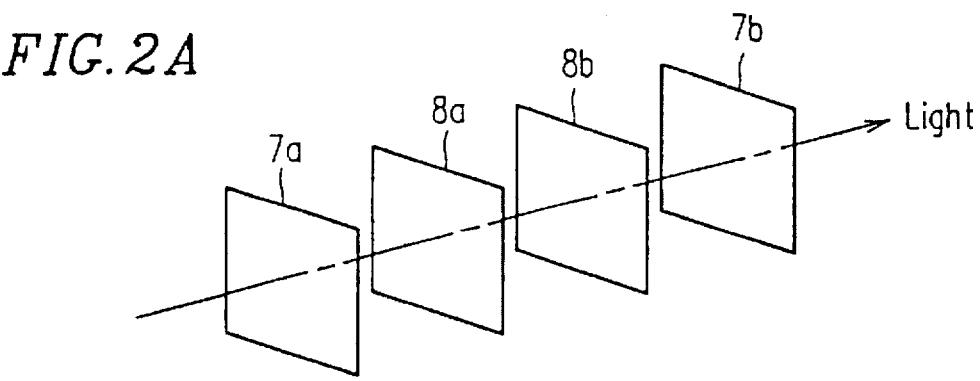
FIGS. 2A through 2E show arrangements of the AFLC device of Example 1 according to the present invention.

Furthermore, as shown in FIG. 2A, two polarizing plates 7a and 7b are disposed so as to sandwich two cells 8a and 8b therebetween.

Figure 2B:
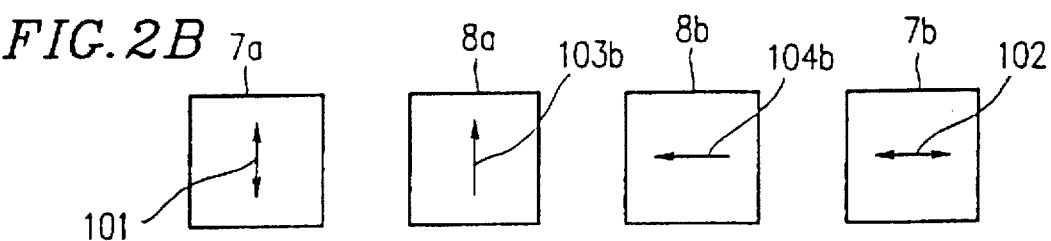

FIG. 2B shows an arrangement of optic axes with no electric field applied. Under the application of no electric field, the normal to the AFLC layer of the cell 8a matches with an optic axis 103b thereof, and the normal to the AFLC layer of the cell 8b matches with an optic axis 104b thereof. Since the cells 8a and 8b are disposed so that the optic axes 103b and 104b are orthogonal to each other, when the polarizing plates 7a and 7b are disposed so that polarization axes 101 and 102 are orthogonal to each other, a black state can be obtained.

Figure 2C:
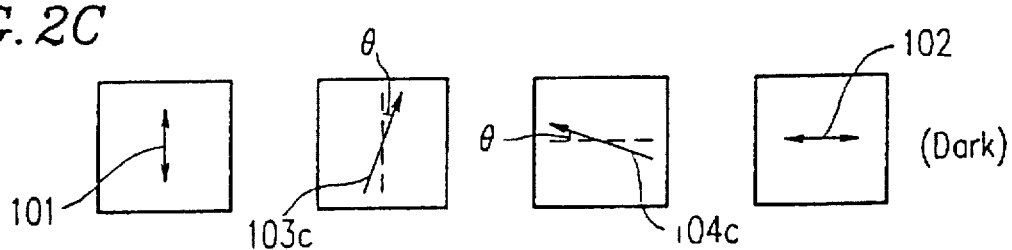
Figure 2D:
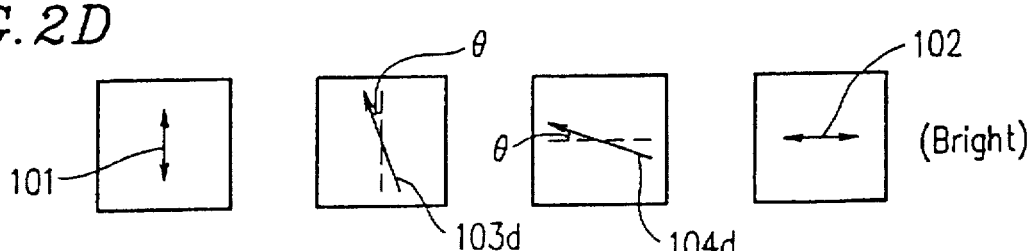

When a voltage of a predetermined polarity and a level sufficient for allowing liquid crystal molecules to shift from an AFLC state to an FLC state is applied to the cell 8b, an optic axis 104c tilts by an angle of θ as shown in FIG. 2C. The angle θ varies depending upon the AFLC material and is determined by the relationship between the sign of the spontaneous polarization of the AFLC material and the sign of a voltage to be applied to the cell 8b. When a voltage of a level and a polarity identical with those applied to the cell 8b is applied to the cell 8a, an optic axis 103c tilts by an angle of θ, as shown in FIG. 2C. In this case, since the optic axis 103c is orthogonal to the optic axis 104c, a dark state can be obtained.

On the other hand, when the same voltage is applied to the cell 8b and a voltage of a level identical with that of the voltage applied to the cell 8b and of an opposite polarity thereto is applied to the cell 8a, an optic axis 103d tilts by an angle of −θ. In this instance, when an angle 2θ formed by the optic axis 103d of the cell 8a and an optic axis 104d of the cell 8b is not 90°, a bright state is obtained, and when 2θ is about 45°, the brightest display can be obtained.

Figure 2E:
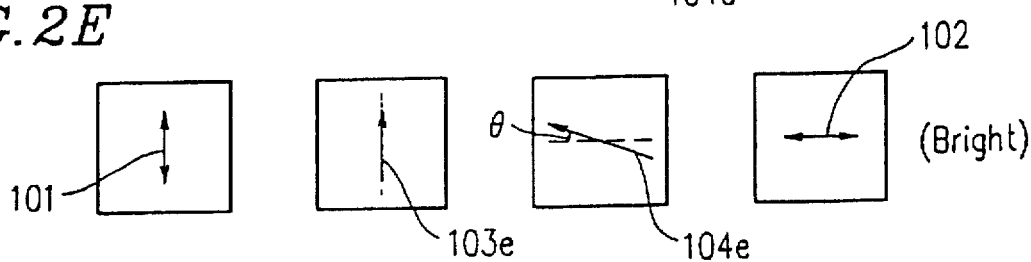

As is understood from the above description, when a voltage of a predetermined polarity and a level sufficient for allowing liquid crystal molecules to shift from an AFLC state to an FLC state is applied to the cell 8b and an arbitrary desired voltage is applied to the cell 8a, the angle of the optic axis of the cell 8a varies between θ and −θ depending upon the level of a voltage applied to the cell 8a and the sign thereof. As a result, the amount of transmitted light is obtained in accordance with the voltage applied to the cell 8a, and arbitrary brightness can be obtained by varying the level of the applied voltage to an arbitrary negative or positive one. For example, when the voltage applied to the cell 8a is 0 volt, the optic axis thereof is as represented by 103e in FIG. 2E, and moderate brightness can be obtained. Thus, a gray-scale display can be obtained by applying an appropriate voltage to the cell 8b in accordance with a desired amount of transmitted light.

In the case of single-layered AFLC devices, the brightest display can be obtained when θ is 45°; however, the device satisfying this condition is not easy to produce. In contrast, according to the present invention, the brightest display can be obtained when θ is about 22.5; therefore, the device satisfying this condition is relatively easily produced.

As described above, in Example 1, two AFLC cells 8a and 8b are disposed so that the normals are orthogonal to each other, whereby an AFLC device capable of performing a gray-scale display with a high contrast can be obtained.

In Example 1, the cells 8a and 8b can be replaced by each other.

Although the polarization axis of the polarizing plate 7a is allowed to match with the normal of the cell 8a, other arrangements can be used. It is required that the two polarizing plates 7a and 7b are disposed so that the polarization axes are orthogonal to each other; however, the polarization axes of the polarizing plates 7a and 7b are allowed to form an angle with the normals of the cells 8a and 8b. It is noted that, in terms of the symmetrical property of the display, the polarization axes of the polarizing plates 7a and 7b are preferably allowed to match with the normal of either one of the cells 8a and 8b.

Although two polarizing plates 7a and 7b are disposed on both surfaces of the device in Example 1, a dichroic colorant can be contained in the cells 8a and 8b instead of, or in addition to using the polarizing plates 7a and 7b. When one or two polarizing plates is used in this case, contrast can be further enhanced. It is noted that when two polarizing plates are used, the polarization axes thereof should be orthogonal to each other. Alternatively, when a dichroic colorant is contained in one or both of the cells 8a and 8b and two polarizing plates are used, contrast can be enhanced.

The AFLC materials 4 included in the cells 8a and 8b may be the same or different; any materials can be used as long as they have almost the same characteristic of voltage-transmitted light amount.

For example, as shown in FIG. 3, it is possible that a voltage is applied to the cell 8b while a polarity thereof is reversed with time, and an appropriate voltage is applied to the cell 8a in accordance with a desired amount of transmitted light. When the device is driven like this, a DC component is not allowed to remain, so that the operational reliability of the device can be enhanced.

Furthermore, by forming the electrode films 2 of the cells 8a and 8b into an X-Y matrix, the AFLC device of the present invention can be made an X-Y matrix type display device. Each of the two cells 8a and 8b can be made an X-Y matrix type.

In general, X-Y matrix displays can be performed by, for example, an active driving method. The active matrix driving device has a cell, for example, which includes an AFLC material between a transparent substrate having an electrode film and an alignment layer and a Si substrate having an electrode film, an alignment layer, and a circuit element. In such a device, a gray-scale display can be performed by varying a level of a voltage applied to the AFLC material through the circuit element included in the Si substrate. The Si substrate has no transparency, so that the active matrix driving device can be used as a reflective liquid crystal device by using the Si substrate for the cell disposed on a side opposite to that on the viewing side.

Hereinafter, a method for active-driving the AFLC device of the present invention will be described by way of illustrative Example 2.

Example 2

In Example 2, a reflective AFLC device is produced. The device has an X-Y matrix cell using a substrate provided with a switching circuit element of a silicon gate NMOS (N-type metal—oxide film—silicon) as a first AFLC cell, and a non X-Y matrix cell as a second AFLC cell.

Figure 4:
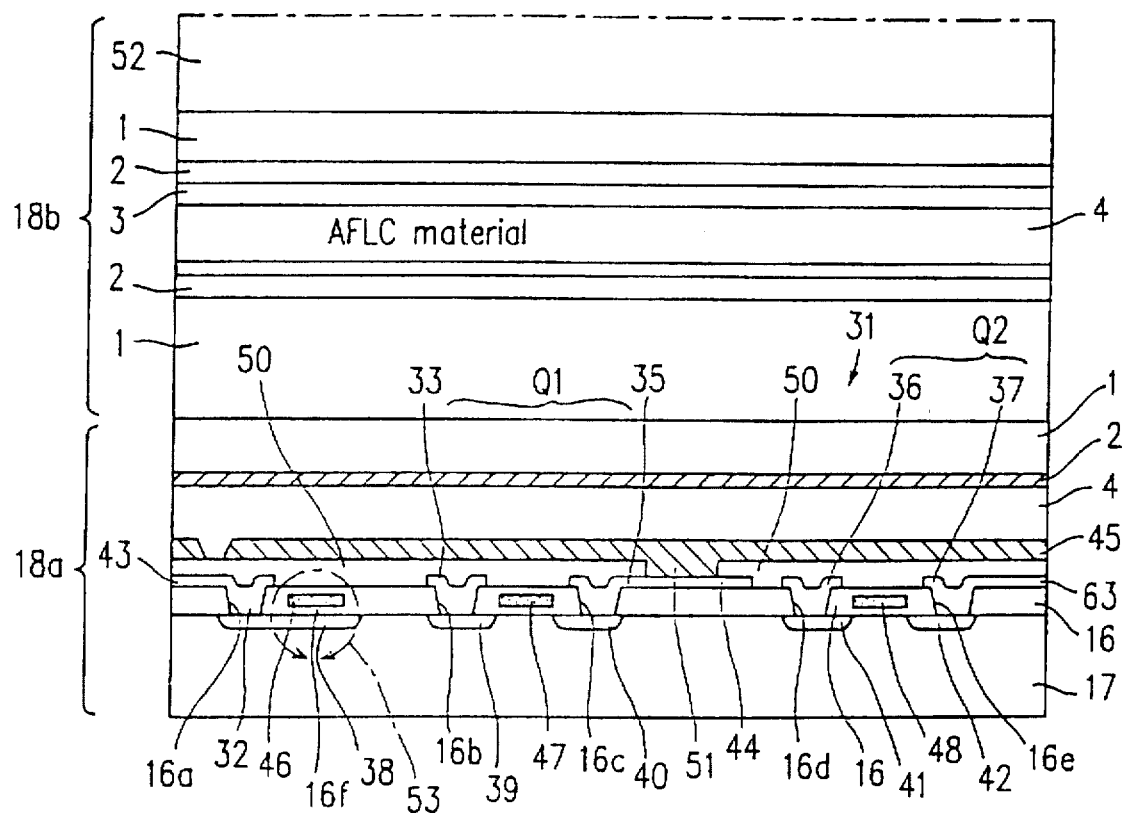
FIG. 4 is a cross-sectional view showing a structure of an AFLC device of Example 2 according to the present invention.
Figure 5:
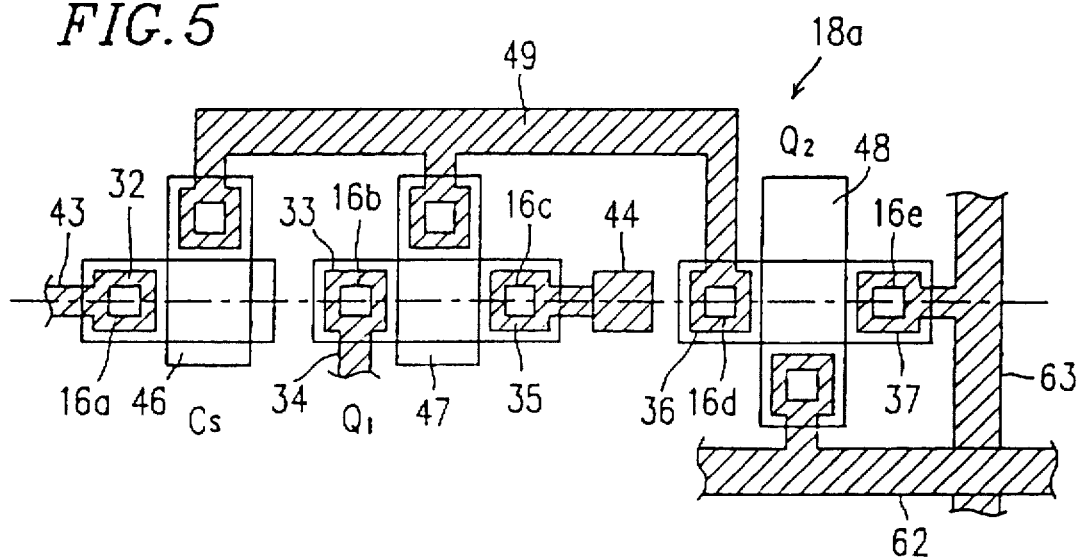
FIG. 5 is a plan view of a first cell 18a shown in FIG. 4.

FIG. 4 is a cross-sectional view showing one pixel of the AFLC device of Example 2; FIG. 5 is a plan view of a first AFLC cell 18a shown in FIG. 4. In this device, the first cell 18a has a silicon oxide film 16 on a substrate 17 made of P-type single-crystal silicon, and the silicon oxide film 16 has 5 through holes 16a to 16e on a pixel basis. In a plurality of regions in the substrate 17 including the lower parts of the respective through holes 16a to 16e, N-type diffusion layers are formed: an N-type diffusion region 38, source regions 39 and 42, and drain regions 40 and 41. A gate electrode 47 and a gate electrode 48 respectively made of a polysilicon film are formed on the substrate 17 respectively extending from the source region 39 to the drain region 40 and from the source region 42 to the drain region 41, and the silicon oxide film 16 covers the gate electrodes 47 and 48. The gate electrode 47, the source region 39, and the drain region 40 constitute a transistor Q1, and the gate electrode 48, the source region 42, and the drain region 41 constitute a transistor Q2.

The gate electrodes 47 and 48 of the transistors Q1 and Q2 are insulated from each other by the silicon oxide film 16 and an aluminum electrode 44 for connection on the substrate 17. In each unit pixel region, a storage capacitance 53 is provided in addition to the transistors Q1 and Q2. The storage capacitance 53 is constituted by a polysilicon electrode 46 formed in the silicon oxide film 16 so as to be close to the transistor Q1, an N-type diffusion layer 38 formed in the substrate 17 so as to correspond to the position of the polysilicon electrode 46, and an insulating film 16f interposed between the polysilicon electrode 46 and the N-type diffusion layer 38.

In upper peripheral portions of the through holes 16a to 16e on the silicon oxide film 16, a ground electrode 32, source electrodes 33 and 37, and drain electrodes 35 and 36, respectively made of aluminum and the like, are formed so as to reach the surface of the substrate 17. The ground electrode 32 is connected to a ground line 43, the source electrode 33 is connected to a power supply line 34, and the source electrode 37 is connected to a data line 63. A protective film 50 made of an electrically insulating material such as silicon oxide for protecting circuits formed on the substrate 17 is formed so as to cover the entire surface of the electrodes 32, 33, 35, 36, and 37, a scanning line 62, and the data line 63.

The protective film 50 has a through hole 51 in a position corresponding to the electrode 44, and a reflective electrode 45 is formed on the protective film 50 on a pixel basis. The reflective electrode 45 is partially connected to the electrode 44 through the through hole 51. Because of this, the drain region 40 is connected to the reflective electrode 45 through the electrodes 35 and 44. In Example 2, although aluminum having high reflectance is used for the reflective electrode 45, other materials can be used.

The gate electrode 48 of the transistor Q2 is connected to the scanning line 62, and the source region 42 of the transistor Q2 is connected to the data line 63 crossing the scanning line 62. The drain region 41 of the transistor Q2, the gate electrode 47 of the transistor Q1, and the polysilicon electrode 46 of the storage capacitance 53 are connected to a common aluminium wiring 49 formed on the silicon oxide film 16.

In Example 2, although polysilicon films are used for the gate electrodes 47 and 48, and the electrode 45, other materials can be used.

An alignment layer (not shown) is formed on the upper most face of a substrate portion including the substrate 17. This substrate portion is attached to a substrate portion including a counter electrode made of a transparent electrode 2 and an alignment layer (not shown) both formed on a transparent glass substrate 1 so that the respective alignment layers (not shown) face each other. An AFLC material 4 is disposed in a gap between the substrate portions, whereby the first AFLC cell 18a is constructed.

Next, a second AFLC cell 18b will be described. The cell 18b includes transparent glass substrates 1. A transparent electrode 2 and an alignment layer 3 are formed on each substrate 1 to form a substrate portion. The substrate portions are attached to each other so that the alignment layers 3 face each other. An AFLC material 4 is disposed in a gap between the substrate portions. The cells 18a and 18b are layered on top of the other to construct a double-layered AFLC device. A filter 52 (described later) is formed on the surface of the cell 18b opposite to the cell 18a, and the cell 18b is used as a light incident side.

In order to suppress the connection resistance between the reflective electrode 45 and the electrode 44, the reflective electrode 45 is heat-treated after being formed. At this time, there are some cases where unevenness occurs on the surface of the reflective electrode 45 to cause a decrease in reflectance. Therefore, in Example 2, in order to smoothen the surface of the reflective electrode 45 thereby enhancing the reflectance thereof, the surface of the reflective electrode 45 is ground to be smooth after the protective film 50 is formed and after the heat treatment of the reflective electrode 45 is conducted. Smoothening the surface of the reflective electrode 45 leads to the enhancement the alignment of liquid crystal molecules. In particular, when alignment control is difficult and minute unevenness on the substrates causes defects as in AFLC materials, smoothening the reflective electrode can be remarkably effective for making the alignment of the liquid crystal molecules satisfactory.

Figure 6:
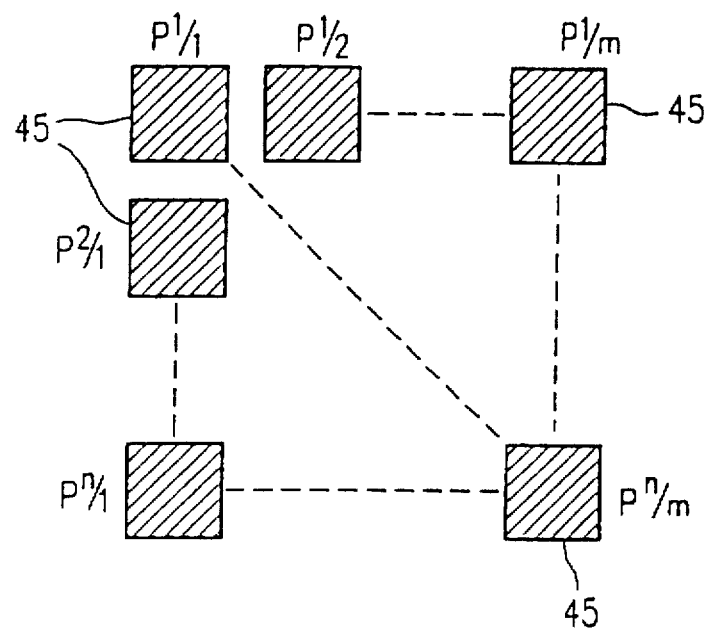
FIG. 6 shows an arrangement of pixels of the AFLC device of Example 2 according to the present invention.

In Example 2, although the reflective electrodes 45 forming each pixel are arranged so that the pixels are disposed in a matrix as shown in FIG. 6, the pixels can be arranged in a delta form. In Example 2, since a single-crystal substrate is used as the substrate 17, IC production technology can be directly applied to the production of the cell 18a. More specifically, highly developed technologies such as microprocessing technology, high-quality thin film forming technology, high-precision impurity introducing technology, crystal defect control technology, production technology, device and circuit design technology, and CAD (Computer Aided Design) technology can be used. Besides that, the cells can be produced simultaneously with other ICs in a clean room of an existing IC factory. Therefore, capital investment not necessarily needed, decreasing production costs.

Next, a coloring technique of a field sequential system in Example 2 will be described with reference to FIG. 7.

Figure 7:
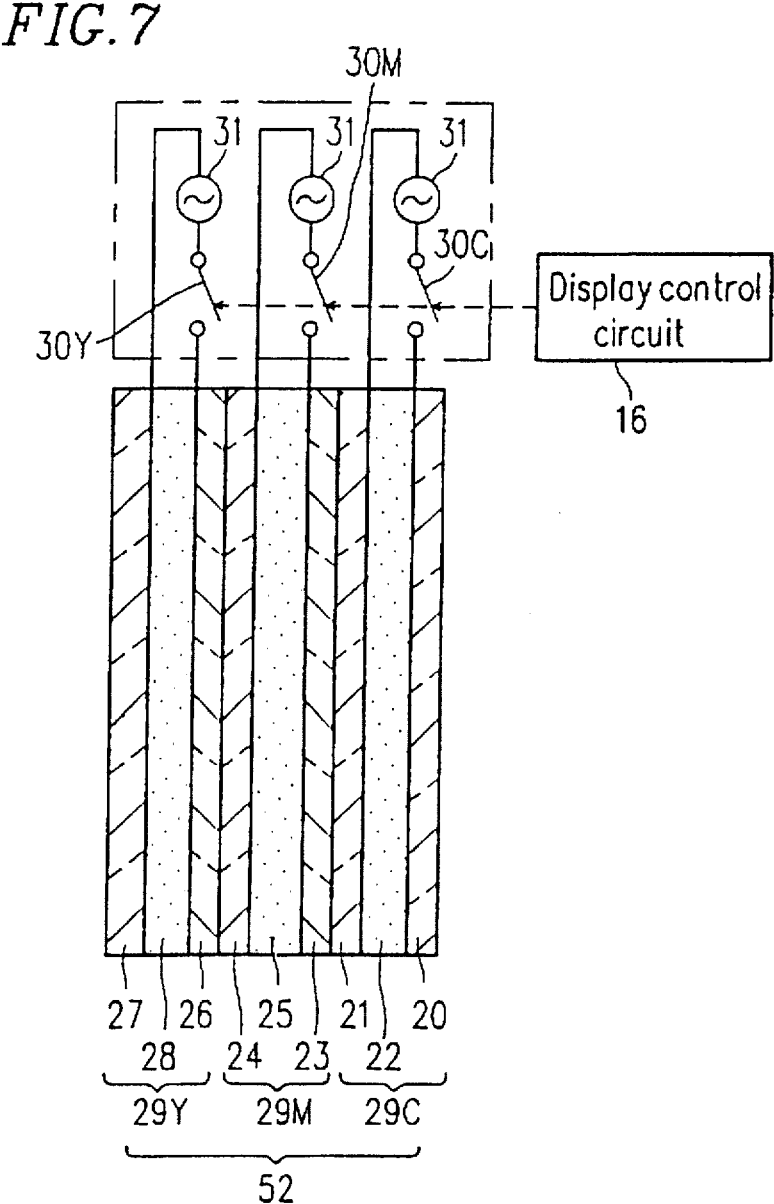
FIG. 7 is a cross-sectional view showing a structure of a filter 52 used in Example 2 according to the present invention.

FIG. 7 is a cross-sectional view showing a structure of the filter 52 shown in FIG. 4. The filter 52 is a flat type filter capable of sequentially switching color at a high speed. The filter 52 includes a cyan filter 29C, a Magenta filter 29M, and a yellow filter 29Y layered in this order. The cyan filter 29C has transparent electrodes (not shown) respectively over entire surfaces of a pair of transparent substrates 20 and 21 facing each other. Liquid crystal 22 containing a dichroic colorant capable of cyan coloring (described later) is disposed between the substrates 20 and 21. The magenta filter 29M has transparent electrodes (not shown) respectively over entire surfaces of a pair of transparent substrates 23 and 24 facing each other. Liquid crystal 25 containing a dichroic colorant capable of magenta coloring (described later) is disposed between the substrates 23 and 24. The yellow filter 29Y has transparent electrodes (not shown) respectively over entire surfaces of a pair of transparent substrates 26 and 27 facing each other. Liquid crystal 28 containing a dichroic colorant capable of yellow coloring (described later) is disposed between the substrates 26 and 27.

The cyan filter 29C, the magenta filter 29M, and the yellow filter 29Y respectively absorb light in bands of cyan, magenta, and yellow from incident light. Thus, light transmitted through the cyan filter 29C, the magenta filter 29M, and the yellow filter 29Y become red, green, and blue, respectively.

In the AFLC device of Example 2, each transparent electrode of the cyan filter 29C, the magenta filter 29M, and the yellow filter 29Y is supplied with an AC voltage from an AC power source 31 through a switching circuit 30C, 30M, and 30Y, respectively. The switching circuits 30C, 30M, and 30Y perform an on/off control of each of the cyan filter 29C, the magenta filter 29M and the yellow filter 29Y by selectively supplying the AC voltage thereto, based on a switching signal from a display control circuit 16. By performing an on/off control of each filter in this manner, light beams of the three primary colors, i.e., red, green, and blue can be generated.

Table 1 shows the relationship between the driven state of each filter and the color of transmitted light.

TABLE 1

| Driven state | | | Color of |
|---|---|---|---|
| 29C | 29M | 29Y | output light |
| ON | OFF | OFF | Red |
| OFF | ON | OFF | Green |
| OFF | OFF | ON | Blue |

Figure 8:
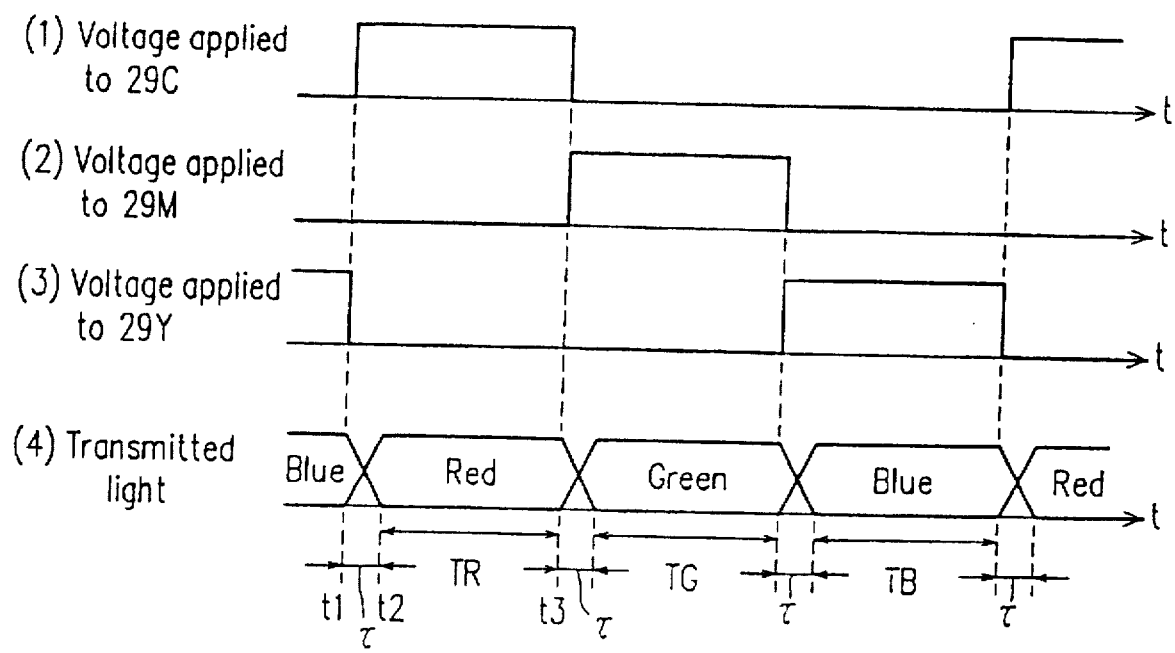
FIG. 8 is a timing diagram showing the operation of the filter 52 used in Example 2 according to the present invention.

FIG. 8 is a timing diagram showing a basic operation of the filter 52 shown in FIG. 7. As shown in FIG. 8, a voltage is applied to the cyan filter 29C during a period of t1 to t3. Liquid crystal molecules do not change in their orientation state immediately after the application of a voltage. More specifically, liquid crystal molecules require a predetermined transition period τ which corresponds to a response recovery speed of the liquid crystal molecules with respect to an electric field. For this reason, even if a voltage starts being supplied to the cyan filter 29C at t1, it takes the transition period τ for the cyan filter 29C to respond to the voltage, allowing the change in orientation state of liquid crystal molecules therein to be stabilized. Specifically, the change in orientation state of the liquid crystal molecules is stabilized at t2. Thus, light transmitted through the filter 52 turned red during a period TR from t2 to t3. Thereafter, a voltage is repeatedly supplied to the cyan filter 29C, the magenta filter 29M, and the yellow filter 29Y in the similar manner, whereby light transmitted through the filter 52 turns red, green, and blue in this order.

The filter 52 is not limited to the above-mentioned structure; in place of this, for example, the filter 52 can be constructed by using three kinds of liquid crystals respectively containing dichroic colorants of red, blue, and green. Any structures, such as layered ones of a color polarizing plate and a liquid crystal panel and a neutral polarizing plate and a liquid crystal panel, can be used as long as they are basically capable of switching desired color at a high speed.

Hereinafter, response characteristics required for each liquid crystal 22, 25, and 28 used in the filter 52 will be shown. Since the lower limit of a frame frequency for performing a practical video display is about 30 Hz, a period of time allowing the respective colors, i.e., red, blue, and green to be displayed is about 10 milliseconds in this example. In order to allow a sufficient display to be performed for 10 milliseconds, the filter 52 is required to realize color modulation and a display within several milliseconds of response time. In Example 2, in particular, a liquid crystal display mode enabling a high speed response is utilized.

Next, a liquid crystal driving voltage will be described.

Figure 9:
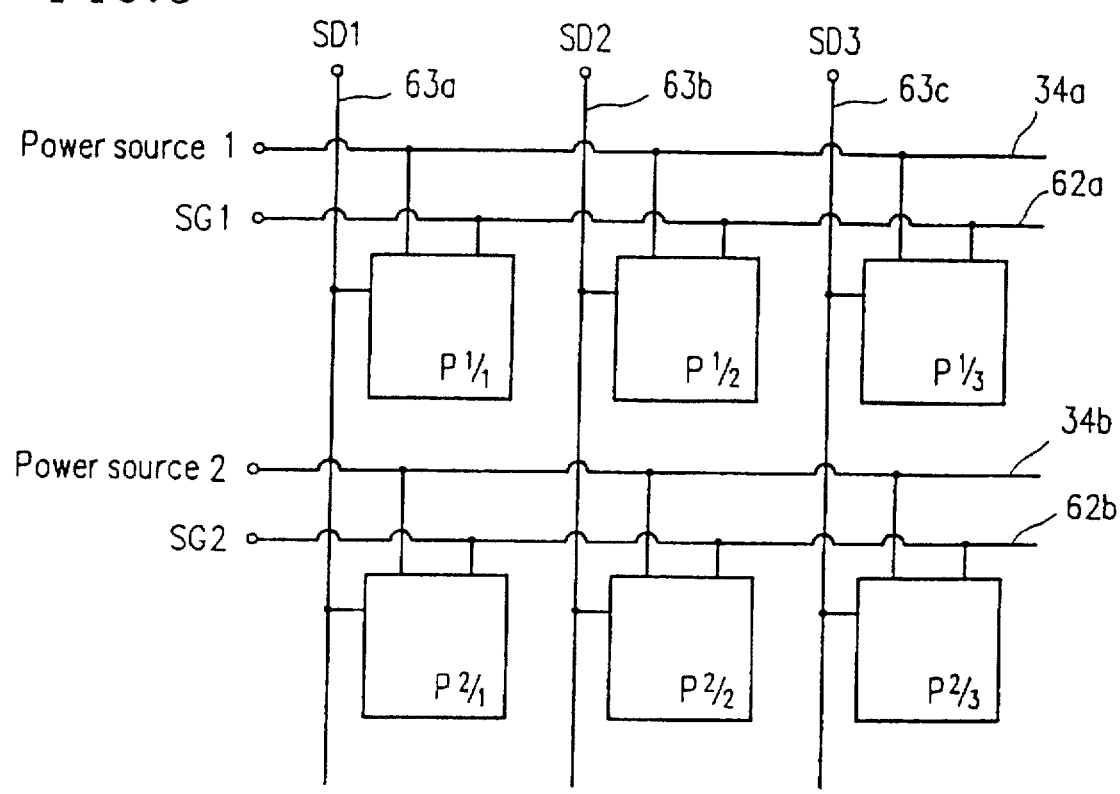
FIG. 9 is a view showing a structure of pixels of the AFLC device of Example 2 according to the present invention.

FIG. 9 shows a structure of pixels of the AFLC device of Example 2 according to the present invention. For simplicity, the operation of the AFLC device will be described by using a matrix formed of pixels P1/1 to P1/3 and P2/1 to P2/3 (hereinafter, collectively referred to as pixels P); however, actually, the AFLC device is intended to be provided with requisite number of scanning lines and data lines. The AFLC device has a plurality of pixels P1/1 to P1/3 and pixels P2/1 to P2/3 formed on a single-crystal silicon substrate 17, and each pixel P is provided with a driving voltage supply circuit 54 as shown in an equivalent circuit of FIG. 10. Each pixel P is connected to a plurality of scanning lines 62a and 62b for supplying gate signals SG1 and SG2 (hereinafter, collectively referred to as a gate signal SG) in a row direction and to a plurality of data lines 63a to 63c for supplying data signals SD1 to SD3 (hereinafter, collectively referred to as a data signal SD) in a column direction.

The pixels P1/1 to P1/3 are commonly supplied with a voltage from a power source 1 through a power source line 34a and are commonly supplied with the scanning signal SG1 through the scanning line 62a. The pixels P2/1 to P2/3 are commonly supplied with a voltage from a power source 2 through another power source line 34b and are commonly supplied with the scanning signal SG2. The pixels P1/1 and P2/1 are supplied with the data signal SD1 through the data line 63a, the pixels P1/2 and P2/2 are supplied with the data signal SD2 through another data line 63b, and the pixels P1/3 and P2/3 are supplied with the data signal SD3 through another data line 63c.

Next, a liquid crystal driving circuit provided in each pixel P will be described.

Figure 10:
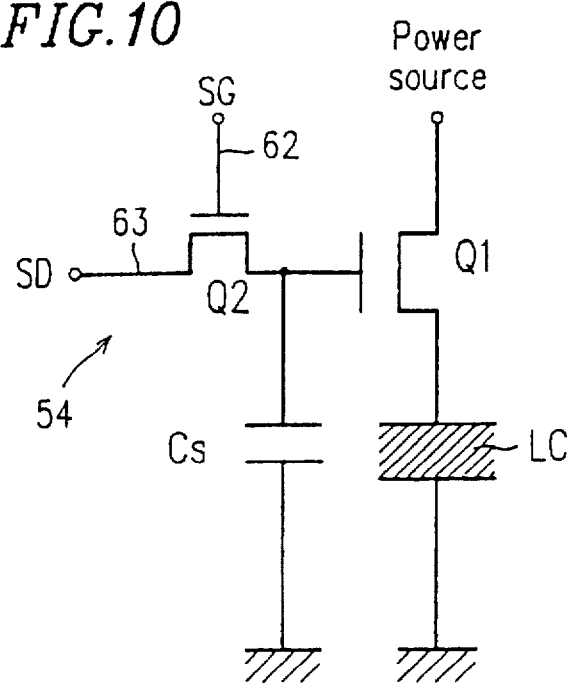
FIG. 10 an equivalent circuit diagram showing one pixel of the AFLC device of Example 2 according to the present invention.

FIG. 10 is a circuit diagram of an example of a switching circuit 54 driving the AFLC material 4 shown in FIG. 4. In FIG. 10, as the transistor Q1 applying a voltage to liquid crystal LC of the AFLC material 4, those showing almost a linear relationship between a gate electric potential and a drain electric potential are desirably used. Since the transistor Q1 supplies a voltage directly to liquid crystal LC of the AFLC material 4, it needs a voltage resistance against a voltage required for switching liquid crystal. The transistor Q2 supplies the data signal SD to the transistor Q1, so that a leak current therefrom during an OFF-time is desirably less. A storage capacitance $C_S$ holds the data signal SD from the transistor Q2. When the data signal SD is supplied to the data line 63, the scanning signal SG is applied to the scanning line 62 to turn on the transistor Q2. At this time, the data signal SD is applied to a gate of the transistor Q1 through the transistor Q2. Simultaneously with this, the data signal SD is held at the storage capacitance $C_S$. The transistor Q1 switches so as to apply a voltage corresponding to the data signal SD to the liquid crystal LC of the AFLC material 4.

An ON-state of the transistor Q1 is held even after the transistor Q2 turns to an OFF-state with an electric charge accumulated in the storage capacitance $C_S$. In this way, when the switching circuit 54 of Example 2 is used, a satisfactory display quality can be obtained even when a liquid crystal material has a low resistance value and large spontaneous polarization.

As described above, by using the silicon single-crystal substrate 17, circuits using a plurality of transistors and capacitances can be constructed, and AFLC devices equipped with functions, which had not been realized by conventional TFTs, can be realized. The equivalent circuit shown in FIG. 10 shows a basic structure, and further desired ones can be obtained by adding transistors and other elements thereto.

Furthermore, by simplifying and miniaturizing the structure, fast-response AFLC devices capable of functioning as a full color projector without using a color filter can be obtained.

Example 3

Figure 11:
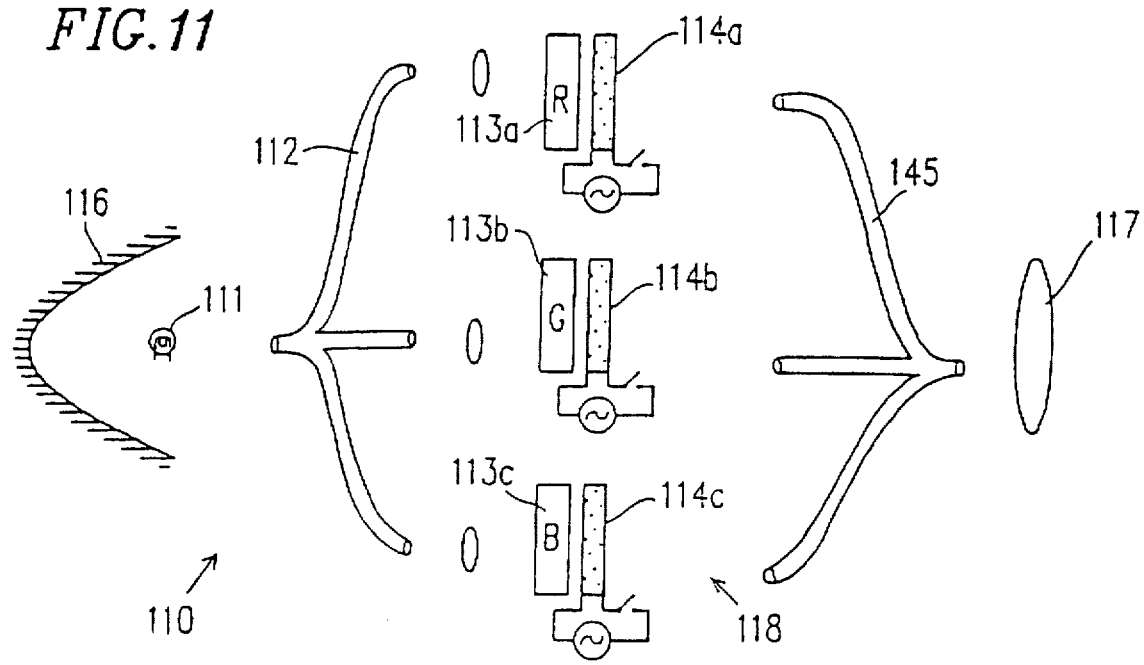
FIG. 11 is a view showing an example of the filter 52 used in Example 3 according to the present invention.

In Example 3, another filter 52 as shown in FIG. 11 is used for the purpose of realizing a field sequential coloring system. In the filter 52, a liquid crystal display device 110 is provided with a light source 111, and light from the light source 111 is reflected by, for example, a reflective mirror 116 with a quadratic surface and focussed. An end of a fiber 112 for light incidence, dividing light into three components, is positioned at a focusing position of light reflected by the reflective mirror 116. Focused light is divided into three components: red, green, and blue components by the fiber 112.

On a light outputting side of the fiber 112, a light shutter 118 is provided, which is composed of color filters 113a, 113b, and 113c and optical switching elements 114a, 114b, and 114c respectively for each component of the light. At the back of the light shutter 118, an optical system (e.g., a fiber 145) for synthesizing light output from the optical switching. elements 114a, 114b, and 114c is provided. Light output from the fiber 145 is modulated by a lens 117. As the color filters 113a, 113b, and 113c, color filters using a dye and a colorant and interference filters formed of layered inorganic or organic optical thin films are used. As the optical switching elements 114a, 114b, and 114c, liquid crystal and ceramics such as PZT are used.

Figure 12:
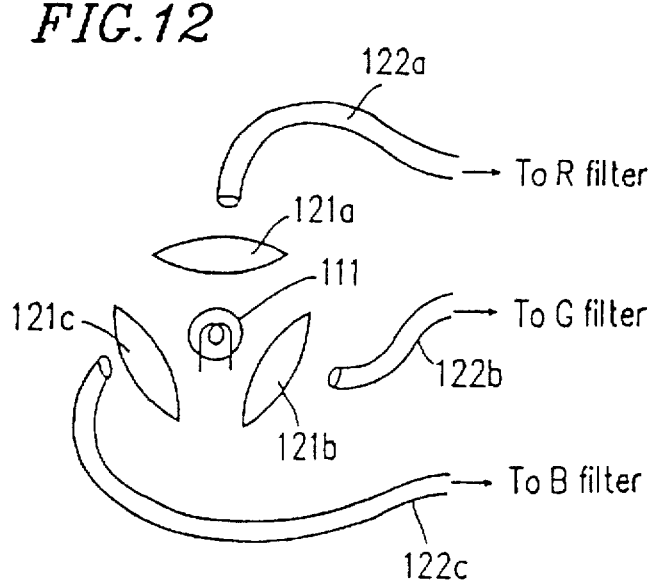
FIG. 12 is a view showing another example of the filter 52 used in Example 3 according to the present invention.

Other systems can be used at the light dividing portion and the light synthesizing portion. For example, the above-mentioned three components of light can be taken out of the single light source 111 by using three sets of lenses 121a, 121b, and 121c, and fibers 122a, 122b, and 122c as shown in FIG. 12. Alternatively, although it is not shown, light can be independently introduced into filters through fibers from three light sources, or the single light source 111, a beam splitter, and a dichroic mirror can be combined.

Hereinafter, the operation of the AFLC device of Example 3 will be described with reference to FIG. 9.

For example, a voltage of +5 volts is supplied from a power source 1 to a power source line 34a, and a voltage of +6 volts is supplied to a scanning line 62a as a scanning signal SG1. Respective data lines 63a, 63b, and 63c are supplied with data signals SD1, SD2, and SD3 given to the respective pixels P. At this time, the data signal SD is assumed to have a positive sign of an electric potential. This scanning allows display data to be written in pixels P1/1, P1/2, and P1/3 in a first row. The polarity of an applied voltage corresponding to data to be written is positive.

Then, the scanning signal SG1 is turned off and the scanning signal SG2 is turned on. A voltage of −5 volts is supplied to the power source line 34b from the power source 2, and a voltage of +6 volts is supplied to the scanning line 62b as the scanning signal SG2. At this time, the voltage of the scanning signal SG2 can be varied in accordance with the polarity of the power source 2. The respective data lines 63a, 63b, and 63c are supplied with data signals SD1, SD2, and SD3 given to the respective pixels P. At this time, the data signal SD is assumed to have a positive sign of an electric potential. This scanning allows display data to be written in pixels P2/1, P2/2, and P2/3 in a second row. The polarity of an applied voltage corresponding to data to be written is negative.

Hereinafter, in the similar manner to the above, a positive signal is written in pixels in an odd number row with an applied voltage, and a negative signal is written in pixels in an even number row with an applied voltage. Required display data is written in a first display frame by performing the above-mentioned scanning over a period of a first display frame. In a second display frame following the first display frame, display data is written with a polarity opposite to that of the first frame. Thus, an AC voltage can be applied to the liquid crystal.

Figure 13:
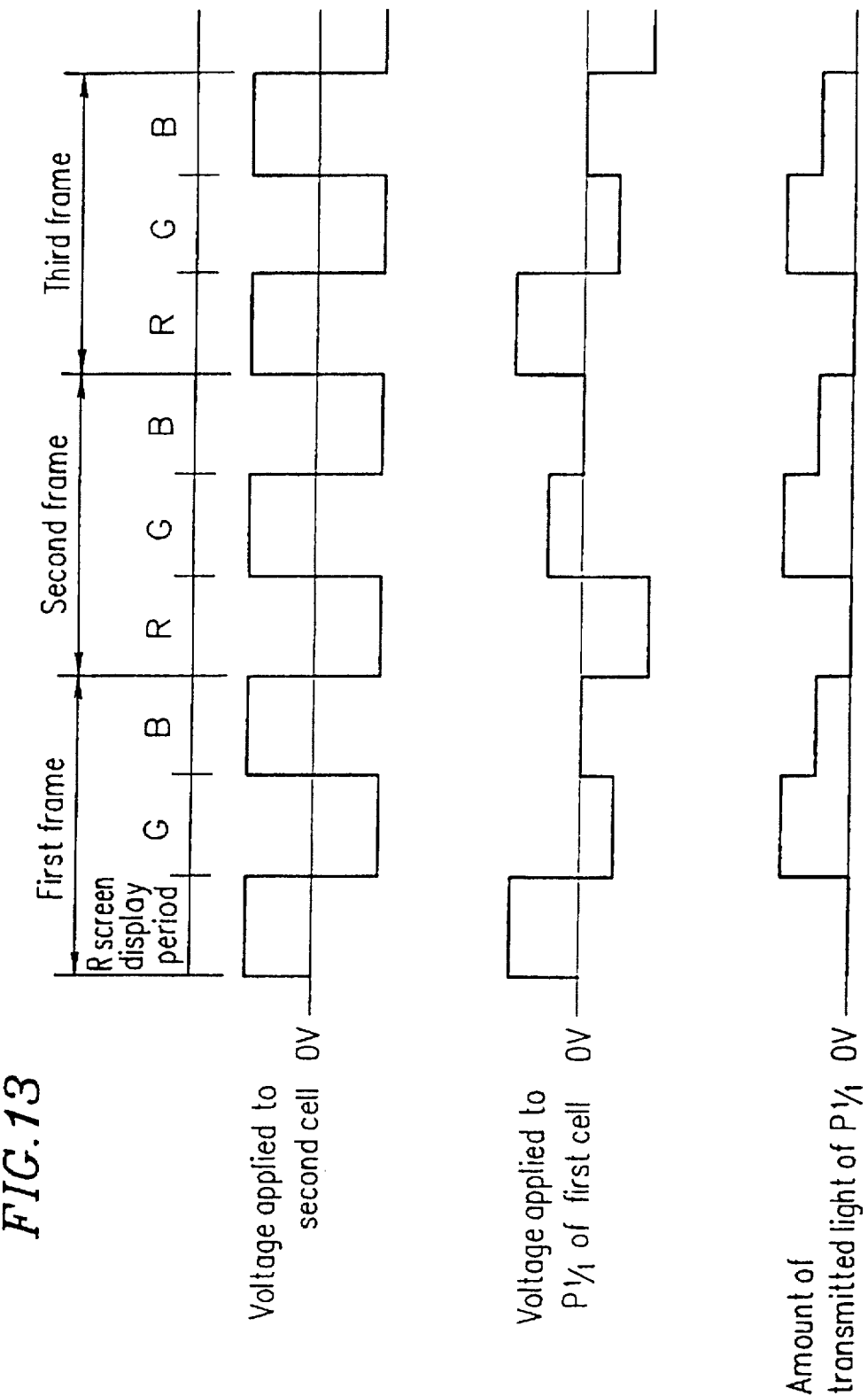
FIG. 13 is a timing diagram illustrating a method for driving an AFLC device of Example 3 according to the present invention.
Figure 14:
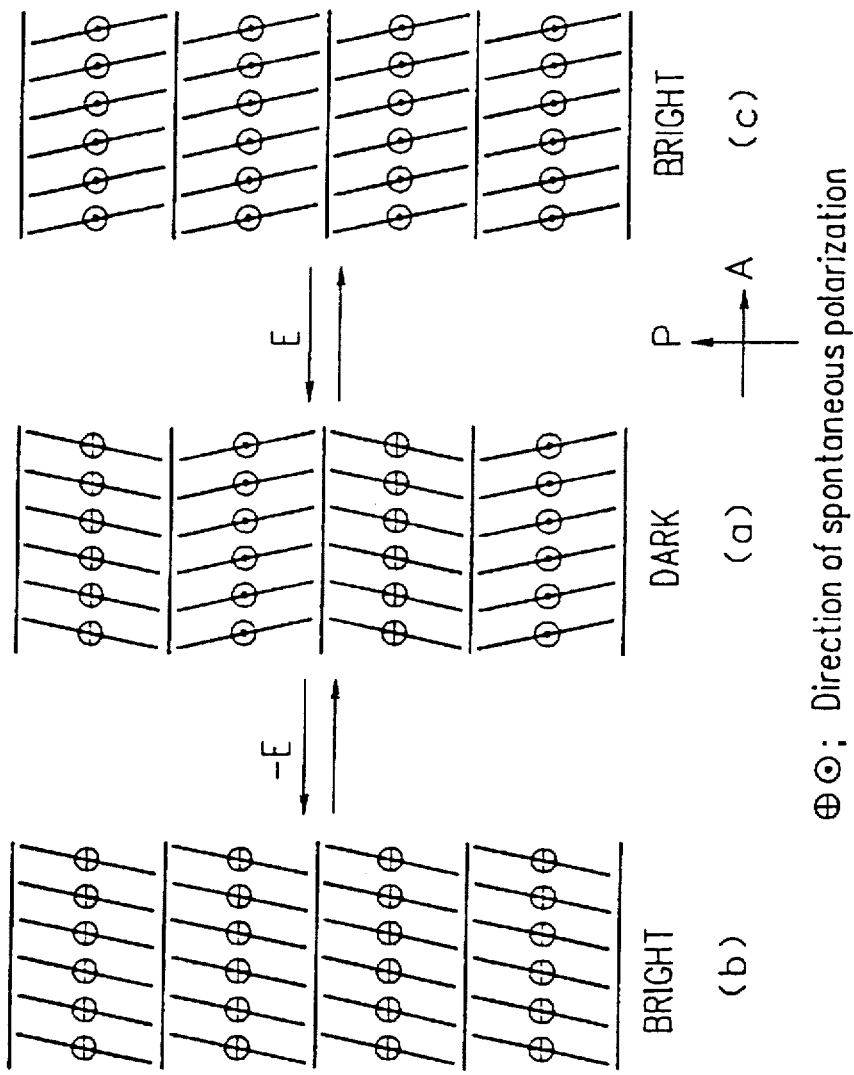
FIGS. 14(a) through 14(c) show the operational principles of AFLC.
Figure 15:
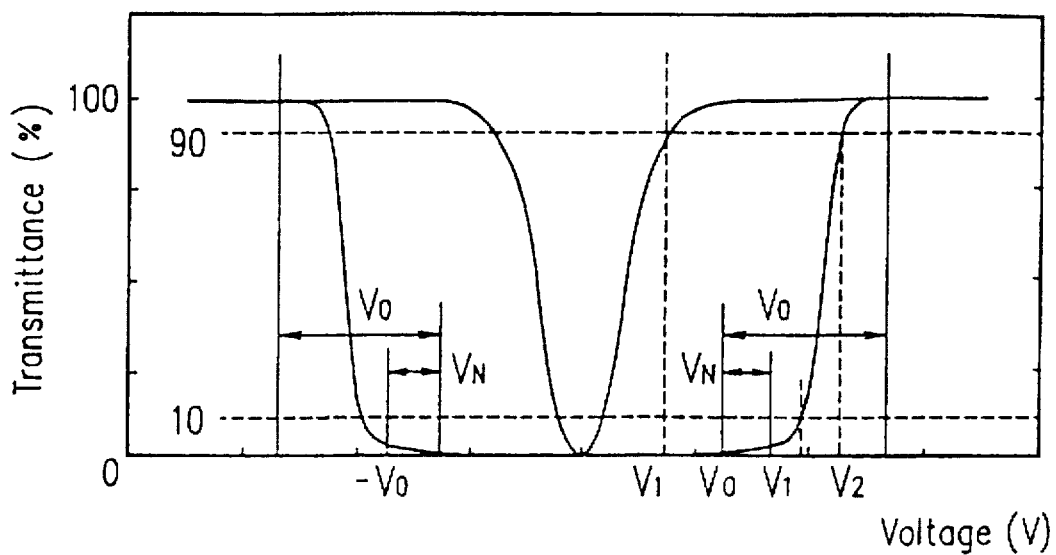
FIG. 15 is a graph showing a voltage-transmittance curve of AFLC.
Figure 16:
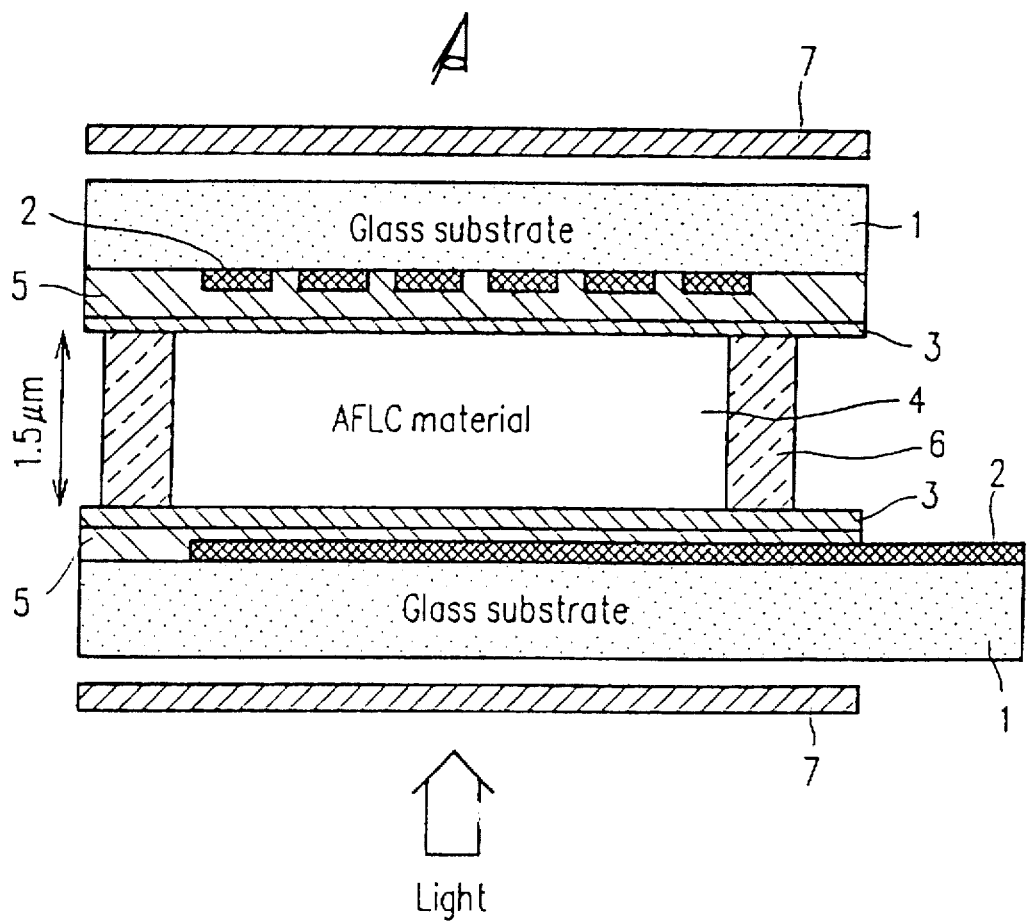
FIG. 16 is a cross-sectional view showing the basic structure of a conventional AFLC device.
Figure 17:
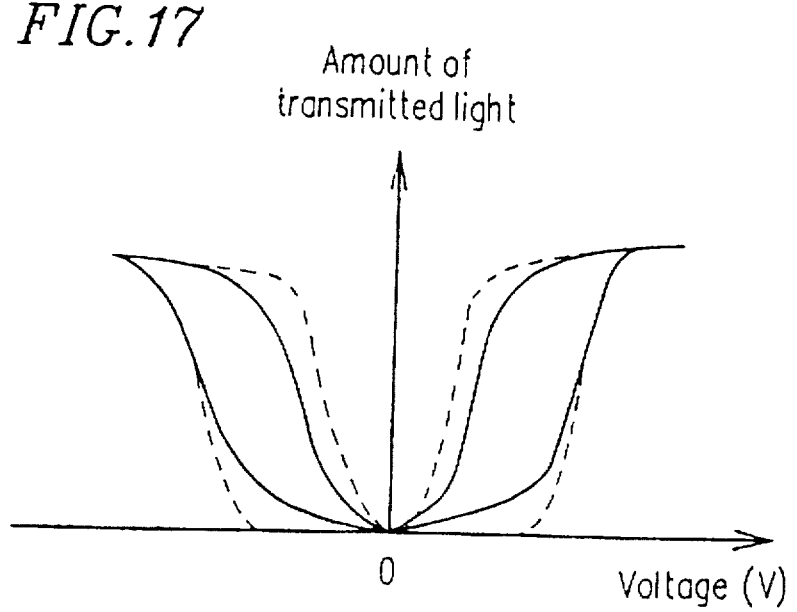
FIG. 17 is a graph showing an actual voltage-transmitted light amount curve of the conventional AFLC device and an ideal voltage-transmitted light amount curve.

By driving the AFLC device as described above, voltages having different polarities can be alternately applied on a one pixel row basis. Driving waveforms actually applied to each pixel can be, for example, as shown in FIG. 13. In this case, a voltage of a predetermined polarity and a level sufficient for shifting liquid crystal molecules from an AFLC state to an FLC state and another voltage of a level identical with that of the voltage of a level sufficient for shifting liquid crystal molecules from an AFLC state to an FLC state and of an opposite polarity thereto are alternately applied to the second cell for a predetermined period (each display period of R, G, and B). Furthermore, a voltage in accordance with a desired amount of transmitted light is applied to the second cell. By driving in this way, a fast-response full color display excellent in reliability can be obtained.

As described above, according to the present invention, an AFLC device capable of performing a gray-scale display with a high contrast can be obtained by providing the first AFLC cell and the second AFLC cell so that normals to AFLC layers are orthogonal to each other.

Furthermore, a voltage of a predetermined polarity and a level sufficient for allowing liquid crystal molecules to shift from an AFLC state to an FLC state and another voltage of a level identical with that of the voltage of a predetermined polarity and a level sufficient for allowing liquid crystal molecules to shift from an AFLC state to an FLC state and of an opposite polarity thereto are alternately applied to the second cell for a predetermined period, whereby an AFLC device excellent in reliability can be obtained.

When a single-crystal Si substrate is used as a substrate for constituting the AFLC cell, IC production technique can be directly applied to the production of the AFLC device, decreasing production costs. In addition, by miniaturizing and simplifying the structure of an AFLC device, a fast-response AFLC device can be obtained.

By being active-driven, the AFLC device can be used as a single substrate full color projector not requiring a color filter.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An antiferroelectric liquid crystal device comprising at least a first antiferroelectric liquid crystal cell and a second antiferroelectric liquid crystal cell, wherein the first and second antiferroelectric liquid crystal cells respectively have an antiferroelectric liquid crystal material interposed between a pair of electrode substrates each having an electrode film and an alignment layer, and the first and second antiferroelectric liquid crystal cells are disposed so that a normal to an antiferroelectric liquid crystal layer of the first antiferroelectric liquid crystal cell is orthogonal to a normal to an antiferroelectric liquid crystal layer of the second antiferroelectric liquid crystal cell.

2. The antiferroelectric liquid crystal device according to claim 1, wherein a substrate gap, between the pair of electrode substrates of the first and second antiferroelectric liquid crystal cells comprising the antiferroelectric liquid crystal material, has a thickness from about 1 to about 3 μm.

3. The antiferroelectric liquid crystal device according to claim 1, wherein at least one of the first and second antiferroelectric liquid crystal cells contains a dichroic colorant.

4. The antiferroelectric liquid crystal device according to claim 1, wherein a pair of polarizing plates are disposed sandwiching the first and second antiferroelectric liquid crystal cells so that respective polarization axes are orthogonal to each other.

5. The antiferroelectric liquid crystal device according to claim 4, wherein a substrate gap, between the pair of electrode substrates of the first and second antiferroelectric liquid crystal cells comprising the antiferroelectric liquid crystal material, has a thickness from about 1 to about 3 μm.

6. The antiferroelectric liquid crystal device according to claim 4, wherein at least one of the first and second antiferroelectric liquid crystal cells contains a dichroic colorant.

7. The antiferroelectric liquid crystal device according to claim 4, wherein the polarization axis of one of the polarizing plates matches with the normal to the antiferroelectric liquid crystal layer of one of the first and second antiferroelectric liquid crystal cells.

8. The antiferroelectric liquid crystal device according to claim 4, wherein at least one of the first and second antiferroelectric liquid crystal cells contains a dichroic colorant.

9. A method for driving an antiferroelectric liquid crystal device including at least a first antiferroelectric liquid crystal cell and a second antiferroelectric liquid crystal cell, the first and second antiferroelectric liquid crystal cells respectively having an antiferroelectric liquid crystal material interposed between a pair of electrode substrates each having an electrode film and an alignment layer, and the first and second antiferroelectric liquid crystal cells being disposed so that a normal to an antiferroelectric liquid crystal layer of the first antiferroelectric liquid crystal cell is orthogonal to a normal to an antiferroelectric liquid crystal layer of the second antiferroelectric liquid crystal cell, the method comprising the steps of:

applying a voltage of a predetermined polarity and a level sufficient for allowing liquid crystal molecules to shift from an antiferroelectric liquid crystal state to a ferroelectric liquid crystal state to either one of the first and second antiferroelectric liquid crystal cells to tilt an optic axis of the antiferroelectric liquid crystal cell with the voltage applied thereto; and applying an arbitrary voltage to the other antiferroelectric liquid crystal cell to obtain a gray-scale display.

10. The method for driving an antiferroelectric liquid crystal device according to claim 9, wherein a substrate gap, between the pair of electrode substrates of the first and second antiferroelectric liquid crystal cells comprising the antiferroelectric liquid crystal material, has a thickness from about 1 to about 3 μm.

11. A method for driving an antiferroelectric liquid crystal device including at least a first antiferroelectric liquid crystal cell and a second antiferroelectric liquid crystal cell, the first and second antiferroelectric liquid crystal cells respectively having an antiferroelectric liquid crystal material interposed between a pair of electrode substrates each having an electrode film and an alignment layer, and the first and second antiferroelectric liquid crystal cells being disposed so that a normal to an antiferroelectric liquid crystal layer of the first antiferroelectric liquid crystal cell is orthogonal to a normal of an antiferroelectric liquid crystal layer of the second antiferroelectric liquid crystal cell, the method comprising the step of:

repeating a first period, during which a voltage of a predetermined polarity and a level sufficient for allowing liquid crystal molecules to shift from an antiferroelectric liquid crystal state to a ferroelectric liquid crystal state is applied to either one of the first and second antiferroelectric liquid crystal cells, and a second period, during which a voltage of level identical with a level of the voltage of the first period and a polarity opposite thereto is applied to the same antiferroelectric liquid crystal cell.

12. The method for driving an antiferroelectric liquid crystal device according to claim 11, wherein a substrate gap, between the pair of electrode substrates of the first and second antiferroelectric liquid crystal cells comprising the antiferroelectric liquid crystal material, has a thickness from about 1 to about 3 μm.

\* \* \* \* \*